(12) United States Patent
Brokken et al.

(10) Patent No.: US 9,098,113 B2
(45) Date of Patent: Aug. 4, 2015

(54) HYBRID DISPLAY DEVICE

(75) Inventors: Dirk Brokken, Eindhoven (NL); Jacobus Maria Antonius Van Den Eerenbeemd, Eindhoven (NL); Floris Maria Hermansz Crompvoets, Eindhoven (NL); Martinus Hermanus Wilhelmus Maria Van Delden, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 164 days.

(21) Appl. No.: 13/389,182

(22) PCT Filed: Jul. 28, 2010

(86) PCT No.: PCT/IB2010/053432
§ 371 (c)(1),
(2), (4) Date: Feb. 6, 2012

(87) PCT Pub. No.: WO2011/018728
PCT Pub. Date: Feb. 17, 2011

(65) Prior Publication Data
US 2012/0133622 A1   May 31, 2012

(30) Foreign Application Priority Data

Aug. 11, 2009  (EP) ..................... 09167605

(51) Int. Cl.
| G09G 5/00 | (2006.01) |
| G06F 3/01 | (2006.01) |
| G06F 3/041 | (2006.01) |
| G09B 21/00 | (2006.01) |

(52) U.S. Cl.
CPC ............... *G06F 3/016* (2013.01); *G06F 3/041* (2013.01); *G09B 21/003* (2013.01)

(58) Field of Classification Search
CPC ....... G06F 3/016; G06F 3/041; G06F 3/0416; G06F 3/0436; G06F 2203/014; G09B 21/013; G09B 21/003
USPC ......................................... 345/156, 173, 204
See application file for complete search history.

(56) References Cited

U.S. PATENT DOCUMENTS

| 2003/0098845 A1* | 5/2003 | Hanson et al. ................. 345/156 |
| 2008/0289952 A1 | 11/2008 | Pelrine et al. |
| 2009/0002205 A1* | 1/2009 | Klinghult et al. ............... 341/33 |
| 2009/0115734 A1 | 5/2009 | Fredriksson |
| 2009/0251421 A1* | 10/2009 | Bloebaum ..................... 345/173 |
| 2010/0156809 A1* | 6/2010 | Nutaro et al. ................. 345/173 |
| 2010/0225596 A1* | 9/2010 | Eldering ....................... 345/173 |
| 2014/0253824 A1* | 9/2014 | He ................................. 349/12 |

OTHER PUBLICATIONS

Ig Mo Koo et al, "Development of Soft-Actuator-Based Wearable Tactile Display", IEEE Transactions on Robotics, vol. 24, No. 3, Jun. 2008, pp. 549-558.*
H. Prahlad et al, "Programmable Surface Deformation: Thickness-Mode Dielectric Elastomers and Their Applications", Jan. 1, 2008, Chapter 21, DOI:10.1016/B978-0-08-047488-5. 00021-6, pp. 217-226.
"Electroactive Polymers as Artifical Muscles: Reality, Potential and Challenges"; Bar-Cohen Editor, SPIE Press, 2004, Second Edition, Chapters 4-7.
Kornbluh et al: "Application to Very Small Devices: Microactuators, Micro-Optics, Microfluidics, and More"; Chapter 22 in Dielectric Elastomers as Electromechanical Transducers; Fundamentals, Materials, Devices, Models and Applications of an Emerging Electroactive Polymer Technology, F. Carpi, Editor, Elsevier Press, 2008, pp. 227-238.

* cited by examiner

*Primary Examiner* — Amare Mengistu
*Assistant Examiner* — Jennifer Zubajlo

(57) ABSTRACT

The invention relates to a display device (100-300) that comprises an image display unit (IDU) for displaying a visual image in combination with an adjacent topology display unit (TDU) that can controllably change the topology on a tactile display surface (TDS). Hence both visual and tactile information can be represented and can be related to each other by a control unit (CU).

20 Claims, 4 Drawing Sheets

HYBRID DISPLAY DEVICE

FIELD OF THE INVENTION

The invention relates to a display device and to a method for presenting information comprising a visual image.

BACKGROUND OF THE INVENTION

Means for representing or displaying visual information are well known and comprise static pictures (e.g. printings) as well as electronic display devices like LCD screens for a dynamic display of images. The physical surface of such display devices is static and usually not related to the image that is displayed.

SUMMARY OF THE INVENTION

Based on this situation it was an object of the present invention to provide means for a more realistic presentation of visual information.

This object is achieved by a display device according to claim 1 and a method according to claim 2. Preferred embodiments are disclosed in the dependent claims.

According to its first aspect, the invention relates to a display device for presenting information, said device comprising the following components:

a) An "image display unit" which has a "visual display surface" at which a visual image can be displayed.

b) A "topology display unit", which is disposed adjacent to the aforementioned visual display surface and is adapted to controllably change the topology of a "tactile display surface" of the topology display unit. As usual, the term "topology" shall denote a three-dimensional structure of a surface, wherein the characteristic dimension of the structure typically ranges between about 0.1 µm and about 5 mm. The topology may be palpable, e.g. as a texture, or it can be so fine that it is visible but cannot be sensed by touch.

According to a second aspect, the invention relates to a method for presenting information with a display device, wherein the term "information" shall comprise any deliberately designed structure, including symbols and ornaments. The method comprises the following steps:

a) Presenting a part of the information optically as a visual image on a visual display surface of an image display unit.

b) Presenting a further part of the information in a haptic way as a changeable topology on a tactile display surface of a topology display unit, wherein the tactile display surface is arranged adjacent to the visual display surface.

The image display unit and/or the topology display unit may be rigid devices or, preferably, be flexible and conformable (e.g. rollable, pliable etc.). The corresponding visual display surfaces and/or tactile display surfaces may be flat (planar) or non-flat, i.e. curved or pre-shaped in an arbitrary way. In case the image display unit is flexible, the topology display unit will preferably be flexible (conformal), too, thus being capable to follow deformations of the visual display surface in perfect adjacency.

Preferably, the topology display unit is at least partially transparent to allow a view onto an image on the visual display surface. Additionally or alternatively the topology display unit may have other optical properties, such as being reflective, transmissive (e.g. a colored layer, or a mirror or black layer with holes), absorbing, colored etc. It should be noted that all mentioned optical properties may refer to an arbitrary range of the electromagnetic spectrum.

The hybrid display device and the method defined above have the advantage that they combine the presentation of optical information in a visual image with the presentation of shape information represented by topology, wherein said topology is superposed to the image. Moreover, the topology can selectively be changed and hence be adapted to dynamically represent topological information. The proposed display device hence enhances the user experience by combining changes in both shape and color in cooperation to convey more information and/or information in a more realistic way. This increases the experience and use of known display means and enables new applications, such as changing the appearance of a surface, combined visual and haptic rendering. The topology increases the realism of the surface appearance since it affects the incident, reflected and transmitted light more realistically than a purely visual display. The topology display unit may for example create the impression of water moving across the tactile display surface, making it appear wet.

In the following, various further developments of the invention will be described that relate to both a display device and a method of the kind described above.

The display device preferably comprises a (first) control unit that is adapted to control the topology which is displayed on the tactile display surface. Hence quite arbitrary spatial and/or temporal patterns of topology can be represented by the device. The control unit may for example be realized by dedicated electronic hardware and/or digital data processing hardware with associated software.

The aforementioned control unit is preferably adapted to relate topology that is displayed on the tactile display surface to a visual image that is displayed on the image display unit (at another point of time or, preferably, simultaneously). The control unit may particularly relate topology and image spatially, i.e. adjust the topology at a point of the tactile display surface in accordance with the corresponding image contents at that point. Images showing different materials, for example wood or metal, may hence be provided with a realistic haptic appearance.

In the most simple case, the image display unit may just be a static image like a printing. Preferably, the image display unit is however a display apparatus on which different visual images can selectively be displayed. Such a display apparatus may particularly comprise a cathode ray tube (CRT), a liquid crystal display (LCD), an Organic Light Emitting Diode (OLED) display, and/or a di-electrophoretic device. Such an image display unit may both be a rigid or a flexible entity.

The topology display unit may not only be able to change the topology on the tactile display surface, but may additionally be adapted to provide sensor signals which indicate the application of external forces (or pressure) on a surface. In some realizations of the topology display unit, such a sensory function corresponds to the inversion of the topology display function and can hence be realized with little additional effort. As the tactile display surface is usually intended and designed for a haptic exploration by a user, it will often happen that forces are exerted on this surface. With the help of the sensor signals, these forces can be detected and, for example, an alarm can be given in case the forces become too high and the display device might be damaged.

According to a further development of the aforementioned embodiment, the display device comprises a (second) control unit that is adapted to evaluate the sensor signals provided by the topology display unit with respect to the location of the applied and sensed external forces. The location of force application can then be associated with certain meanings or codes, which allows for example to implement a keyboard functionality. It should be noted that the second control unit may be integrated with the above first control unit.

A preferred realization of the topology display unit comprises at least one "active stack" with the following components:

a) A layer of an electroactive polymer, called "EAP" in the following, preferably of a dielectric electroactive polymer which changes its geometrical shape in an external electrical field. Examples of EAPs may be found in literature (e.g. Bar-Cohen, Y.: "Electroactive polymers as artificial muscles: reality, potential and challenges", SPIE Press, 2004; Koo, I. M., et al.: "Development of Soft-Actuator-Based Wearable Tactile Display", IEEE Transactions on Robotics, 2008, 24(3): p. 549-558; Prahlad, H., et al.: "Programmable surface deformation: thickness-mode electroactive polymer actuators and their applications", in "Dielectric Elastomers as Electromechanical Transducers; Fundamentals, materials, devices, models and applications of an emerging electroactive polymer technology", F. Carpi, et al., Editors. 2008, Elsevier. p. 227-238; US-2008 0289952 A; all the documents are incorporated into the present application by reference).

b) An array of electrode units that are disposed on a first side of the aforementioned EAP layer. Preferably, the electrode units are selectively addressable, i.e. an individual electrical potential can be applied to each of them.

c) At least one counter-electrode that is disposed on a second side of the EAP layer which is opposite to the first side.

Application of a suitable voltage between an electrode unit of the array and the counter-electrode induces a deformation of the EAP layer at the location between the electrodes, which results in a local change of the three-dimensional surface configuration of the layers. Thus different topologies of the tactile display surface can be realized.

Optionally, the aforementioned realization of the topology display unit may additionally comprise at least one further electrode, called "control electrode" in the following, that can independently be supplied with a potential of its own. The control electrode may particularly be disposed adjacent to the electrode units of the array or to the counter-electrode (i.e. in the same layer as these), or be disposed in the intermediate space between them. With the help of the control electrode, the electrical fields inside the EAP layer may be affected to allow a more versatile control of the resulting layer deformations.

Preferably the EAP layer is (at least partially) transparent, i.e. it transmits more than 10%, preferably more than 50%, most preferably more than 90% of the visible light that impinges on it. It will hence be possible to view an image on the visual display surface through the EAP layer.

In a particular embodiment of the display device, the topology display unit comprises a plurality of the above active stacks, each of them having an EAP layer disposed between an array of electrode units on a first side and at least one counter-electrode on a second side. Preferably, adjacent stacks will share an intermediate electrode layer, i.e. the electrode array on the first side of a given EAP will simultaneously constitute the counter-electrode of the neighboring EAP layer. With the described series of active stacks, the extension and/or type of the topological structures on the tactile display surface can be increased. Moreover, splitting the total thickness of the EAP material into a plurality of EAP layers has the advantage that the voltage required to control each layer is lowered accordingly. This reduces the demands on the driving electronics and, most of all, increases the safe use of the display device.

In the aforementioned embodiment with a plurality of active stacks, the thickness of the EAP layers of the stacks preferably increases with increasing distance of these layers from the tactile display surface. This has the advantage that the voltages needed to operate the EAP layers will be lower closer to the outer surface, thus increasing the safety of the display device because in case of a failure (voltage breakthrough) a user touching the outer surface might experience an exposure to a lower (harmless) voltage.

The indices of refraction of transparent components of the topology display unit are preferably similar to each other; i.e. they differ typically by less than 25%, preferably less than 10%, even more preferably by less than 5%. Such a matching of refractive indices guarantees that optical distortions that may be induced by the different transparent components are minimized or at a well-defined level, and that the topology display unit hence does not impair the view of an image behind it while having a natural appearance.

In an active stack of the above display device, the electrode units of the array and/or a plurality of counter-electrodes and/or a plurality of control electrodes (if present) may particularly cover less than 100%, preferable less than 20%, most preferable less than 5% of the total available area in their respective layer. The aforementioned matching of the refractive indices and the use of appropriate electrode surface area ratios form important aspects of a more natural appearance (matching optics and haptics).

The electrode units of the topology display unit with the EAP and/or a plurality of its counter-electrodes and/or a plurality of its control electrodes (if present) may be arranged in a regular or an irregular array (pattern). Arranging at least one of them in an irregular pattern helps to prevent optical artifacts like of the occurrence of Moiré.

According to another variant of a topology display unit with an EAP layer, there is an additional passive layer that does not generate any conformational changes of its own but only follows the changes of the other layers. The passive layer can hence be used to transform the conformational changes of the active layers, for example to enhance them.

In another embodiment, the topology display unit comprises at least one (electrically) insulating layer that provides the tactile display surface. The insulating layer may particularly be comprised by or be identical to the aforementioned passive layer. The insulating layer shields a user who touches the outer surface of the topology display unit from the electrical voltages inside the topology display unit.

The display device may optionally further comprise an electrically conductive layer that is disposed between the image display unit and the topology display unit and/or between the tactile display surface and any other electrically conductive component of the topology display unit. Moreover, this conductive layer can be provided with a given electrical potential. Preferably, the electrically conductive layer is transparent or only comprises a very small fraction of the respective surface area; this area should be smaller than 100%, preferable less than 20%, and more preferable less than 5% of the total available surface area. A conductive layer on the image display surface can be used to prevent an electrical interference between the image display unit and the topology display unit in case both of them are driven with (different) control voltages. A conductive layer at the tactile display surface increases safety because, in case of a failure, a user touching the topology display unit will first electrically contact this outermost layer with its given electrical potential, which can be chosen in a safe region (e.g. as ground potential).

In a further embodiment of the invention, the display device may comprise a control unit for controlling the topology display unit and/or the image display unit, wherein said control unit is adapted to detect failure conditions and to interrupt electrical power supply to the controlled component in case failure conditions have been detected. Such failure conditions may for instance comprise the detection of leakage currents as they might be caused by a voltage breakthrough in the tactile display surface when it is touched by a user.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components.

DESCRIPTION OF PREFERRED EMBODIMENTS

Several display technologies known in the art are capable of changing the visual appearance of a product (e.g. color or transparency) by using emissive and/or reflective approaches. Although these approaches offer great opportunities to change the visual perception of a surface, they still fail to provide a corresponding representation of natural surface topology by dynamic means, i.e. providing both the looks and feel of vines in wood or rock, skin, brushed aluminum, etc. in an electronic fashion.

In view of this, the invention proposes to use electronic actuation of a dielectric elastomeric layer for the electroactive generation of surface topologies. When transparent, such a layer may be combined with active or passive optical display techniques, thereby allowing for the simultaneous manipulation of optical and tactile surface properties in two or more stacked layers. As a result, the user experience of the surface becomes much more convincing as most, if not all, of the sensory information can be made to match the expectations (or, alternatively, can be made to mismatch on purpose, e.g. for visual/tactile gaming).

Figure 1:
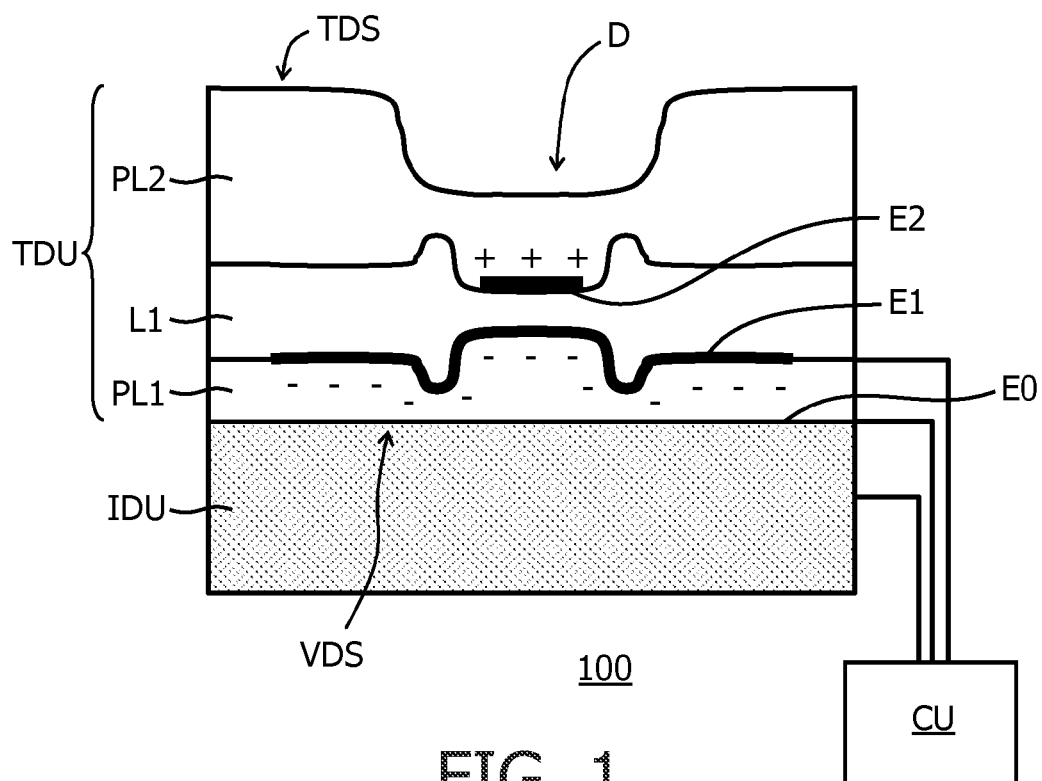
FIG. 1 schematically shows a section along line I-I of FIG. 2 through a part of a display device according to the present invention.

FIG. 1 shows a sectional view (not to scale) of a "hybrid" display device 100 according to the above principles. The drawing depicts only one cell of a plurality of substantially similar cells of the whole display device. The (cell of the) display device 100 comprises the following components:

An "image display unit" IDU with a "visual display surface" VDS at which a visual image can be represented. In the most simple case, the visual display unit IDU could be a static picture like a photo or a printing. Preferably, the visual display unit IDU is however an electronic display apparatus with a plurality of pixels (not shown) that can individually be controlled by an associated control unit CU. Possible display technologies (both reflective and emissive) that can be used for this device comprise di-electrophoretic devices, OLED displays, LED backlit (or side lit) LCD displays or the like.

A "topology display unit" TDU that is coupled to the control unit CU and can be controlled by this to show conformational changes on a "tactile display surface" TDS.

Furthermore, the topology display unit TDU comprises a (passive) substrate layer PL1, an electroactive polymer (EAP) layer L1 (typical thickness: 1-100 µm), and a passive enhancement layer PL2 (typical thickness: 0.1-5 mm).

The EAP layer L1 constitutes an actuating layer. Typically, such actuating layers are capable of deformations (mechanical strains) larger that 10%, preferable more than 20%, even more preferably large than 50%. An example of such an actuating layer is a polymer actuator layer (also known as artificial muscle). Electroactive polymers are developed for example by SRI international (California, USA), and Poly-Power (Nordborg, Denmark), wherein PolyPower offers true roll-to-roll processing of EAPs. Dielectric elastomers are materials that change shape under influence of an electric field (electrostriction). They are a class of polymer actuators that are specifically suited for use in relatively thin (potentially conformable) layers.

A counter-electrode E1 is disposed between the substrate PL1 and the EAP layer L1. Opposite to this, an electrode unit E2 is disposed on the opposite side of the EAP layer L1. At least one of the electrodes E1, E2 is preferably stretchable and (at least partially) transparent. Examples of electrode materials are for instance graphite powder or—grease, Carbon-Nano-Tubes, graphene (graphite mono-layer), PEDOT (PEDOT-PSS used in plastic solar cells), polypyrrole (conducting polymer), or ITO (conductive metal oxide). It should be noted that these materials are just examples of possible materials not limiting the scope of the invention.

Application of a voltage between the counter-electrode E1 and the electrode unit E2 by the control unit CU induces conformational changes of the EAP layer L1. The EAP layer L1 may particularly be compressed in the space between the electrodes E1 and E2, wherein its material is squeezed into the adjacent border zones, which consequently bulge. Due to an averaging effect of the passive enhancement layer PL2, these conformational changes of the EAP layer L1 are translated into the occurrence of a smooth dip D above the electrode unit E2 on the tactile display surface TDS. In the complete display device 100, a large number of such small local conformational changes (dips D) will cause the tactile display surface TDS to assume a certain topology.

At the interface between the image display unit IDU and the topology display unit TDU, measures have to be taken such that the electric field inside the image display is not affected by the high voltages (high electric fields) in the topology display. This can be achieved by providing a bottom electrode E0 of the topology display TDU and giving it the same voltage as the upper electrodes of the image display. In that way the electric field is zero in between and no capacitive charging occurs.

Figure 2:
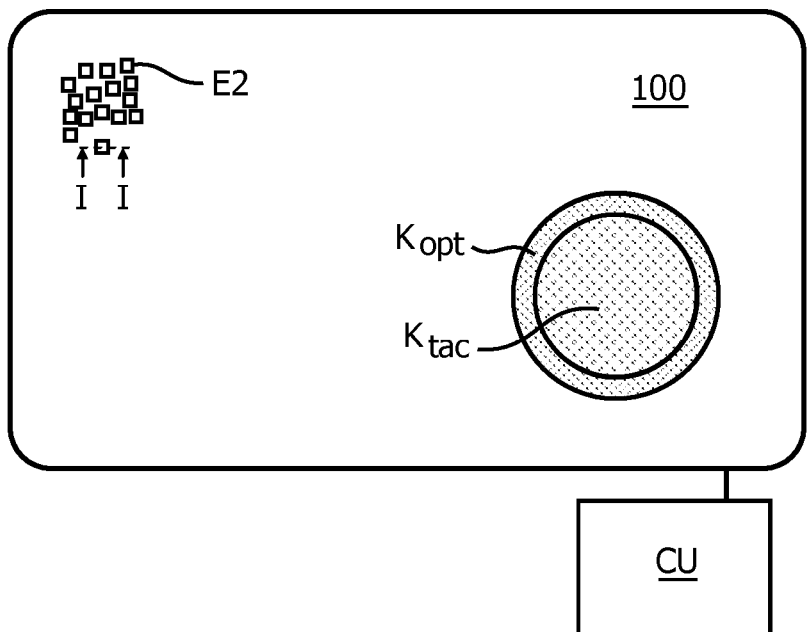
FIG. 2 schematically shows a top view of the display device of FIG. 1.

FIG. 2 shows a top view onto the whole display device 100 of FIG. 1, wherein the section that is depicted in FIG. 1 is indicated by a dashed line I-I. Furthermore, only a few of the electrode units E2 of the electrode array on the top surface of the EAP layer L1 are shown in FIG. 2.

In order to avoid diffraction, refraction and reflection on the different layer interfaces, the indices of refraction at all the interfaces should be preferable made to match as much as possible. In order to avoid Moiré, irregular layouts of the electrode units E2 are preferred.

Moreover, FIG. 2 indicates the realization of a functional component like a control button or a key of a keypad. This key or button is displayed optically as a circle $K_{opt}$ by the image display unit IDU, and is additionally represented at the same position by a particular topology $K_{tac}$ by the topology display unit TDU.

In summary, an essential feature of the invention is to provide dynamic, preferably flexible and conformal electronically controlled surface topologies to a static or dynamic digital surface or interactive finish, with the electronic surface topology substantially matching the expected surface topology and/or texture, resulting in a tactile-visual display.

In a preferred embodiment, this is realized by segmented- or matrix-addressing a layer of transparent, opaque or translucent elastomer, cladded between at least one regular or irregular (patterned) drive electrodes, optionally expanded by at least one opposing, adjacent or interspaced control electrode, with the electrodes and control electrode being either transparent, translucent, opaque, reflected absorbing or colored, non-transparent or any combination thereof, but stacked such that the surface topology generated and the electrode configuration chosen does not distort the information present in the optical domain, not excluding optional enhancement (direction, match, coinciding image and relief structure) of the optical properties and/or appearance of the displaying surface.

Figure 3:
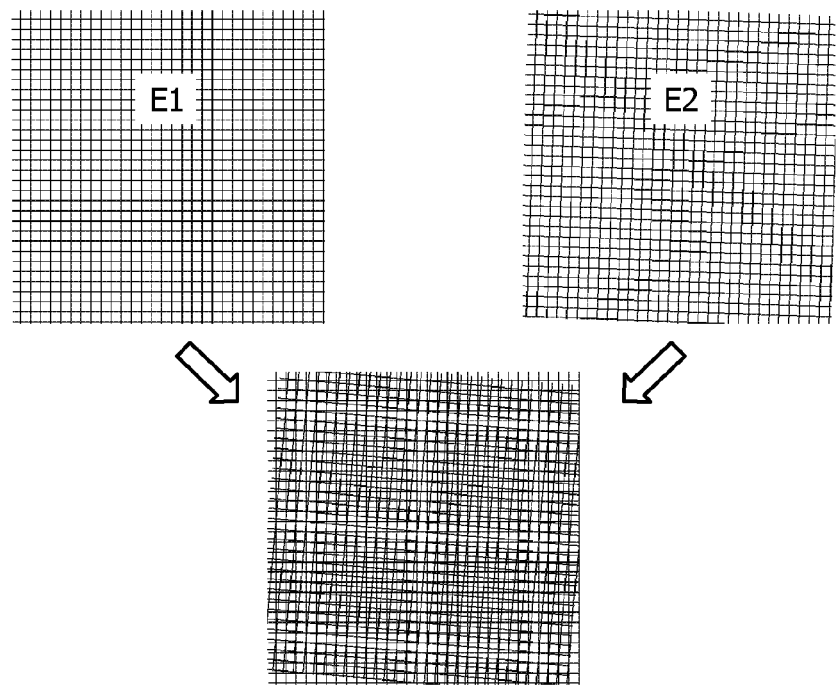
FIG. 3 schematically shows the use of regular electrode arrangements in a display device.

With respect to the aforementioned designs, FIG. 3 shows in a top view onto the display device of FIG. 1 (or a similar one) a regular matrix arrangement of drive electrodes E1, E2 separately (top part of the Figure) and in their combination in the display device (bottom part of the Figure). It can be seen that the combination generates Moiré.

Figure 4:
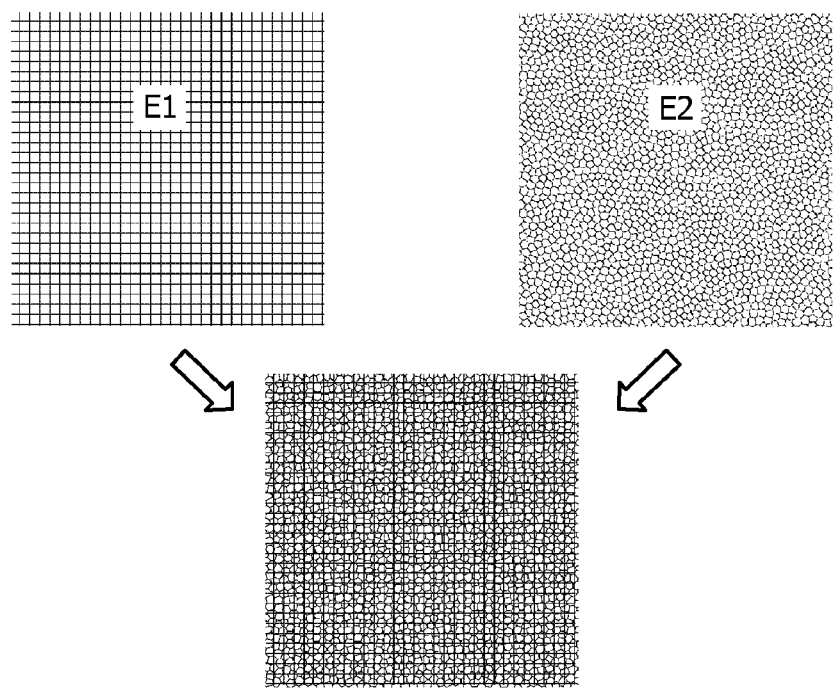
FIG. 4 schematically shows the use of irregular electrode arrangements in a display device.

FIG. 4 shows, in a top view onto the display device of FIG. 1 or a similar one, an irregular matrix arrangement of drive electrodes E2 and a regular arrangement of drive electrodes E1 separately (top part of the Figure) and in their combination in the display device (bottom part of the Figure). No Moiré can occur in this case.

As the combination of two regular arrays will usually cause distortions in the optical domain (Moiré), it is preferred that at least one of the electrodes in the array is irregular, such that when combined with a second (regular or irregular) array under a 90° angle, Moiré cannot be observed. Also in this case no distortions can be observed.

Figure 5:
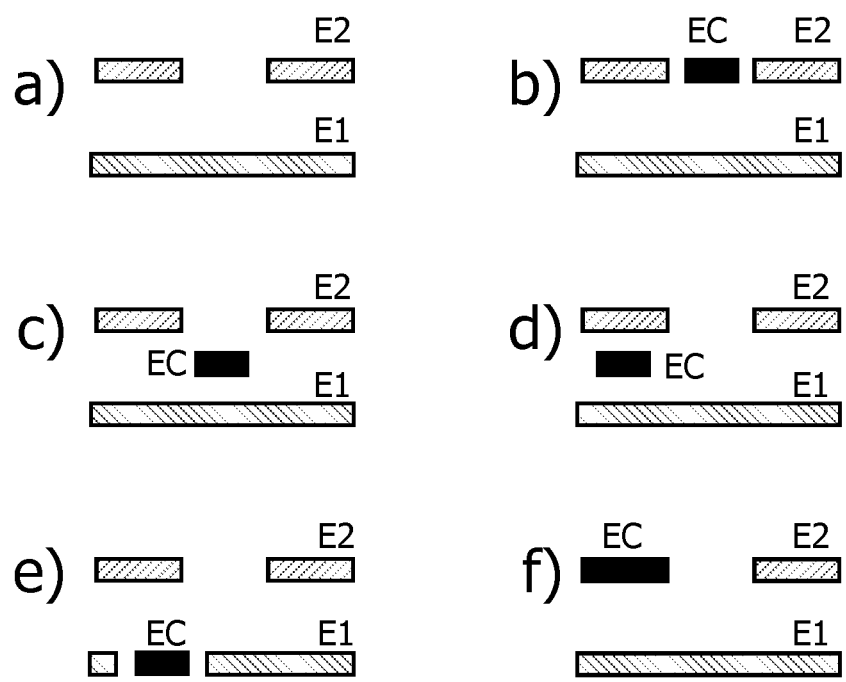
FIG. 5 schematically shows various arrangements of drive electrodes and control electrodes.

FIG. 5 illustrates in a side view of a display device like that of FIG. 1 various arrangements of electrodes, namely:

a) a (regular or irregular) arrangement of drive electrodes E1, E2;

b)+f) an arrangement of drive electrodes E1, E2 with adjacent control electrodes EC in the upper layer;

c)+d) an arrangement of drive electrodes E1, E2 with interspaced control electrodes EC, e) an arrangement of drive electrodes E1, E2 with adjacent control electrodes EC in the lower layer.

Commercially available EAPs are presently characterized by the fact that high electrical fields are needed to actuate them. Accordingly, a topology display unit comprising such EAPs needs high driving voltages (in the range of kilo Volts), which make them difficult and hazardous to operate. Hence proper precautions have to be taken to make these display devices touchable and usable by persons. As one step, external measures can be taken to limit current from the high voltage power supply as well as the storage energy potential. Additionally, two main internal measures are proposed here:

An electrical insulation and shielding between the topology display unit and the finger of the user or other external electric appliances.

A proper electrical shielding between the topology display unit and the image display unit such that the high voltages/electric fields of the first do not influence the operation of the latter.

The first of these measures makes the display intrinsically save, and it can particularly comprise the application of the following two layers on the outside of the display device:

an electrode connected to ground and, on top of that, an electrically insulating layer.

So a user touching the display device will always contact the insulating layer first. And if the insulation fails, the user will contact the ground layer. This can preferably be detected electronically by a control unit, e.g. by means of a capacity measurement, and used to shut down the high-voltage driving of the topology display unit as an extra means of safety.

Furthermore, reduction of the actuating voltages can also be accomplished, for instance by the following means:

Stacking of n actuating layers. Instead of one large voltage difference $\Delta V$ over the entire stack, one can then split the electric field in n smaller portions such that the required voltage difference between corresponding electrodes is only a fraction of $\Delta V$.

Using an actuating material with a low elasticity modulus (Young's modulus). This makes it easier to compress the material, requiring again relatively low electric fields and hence low voltages for actuation.

Figure 6:
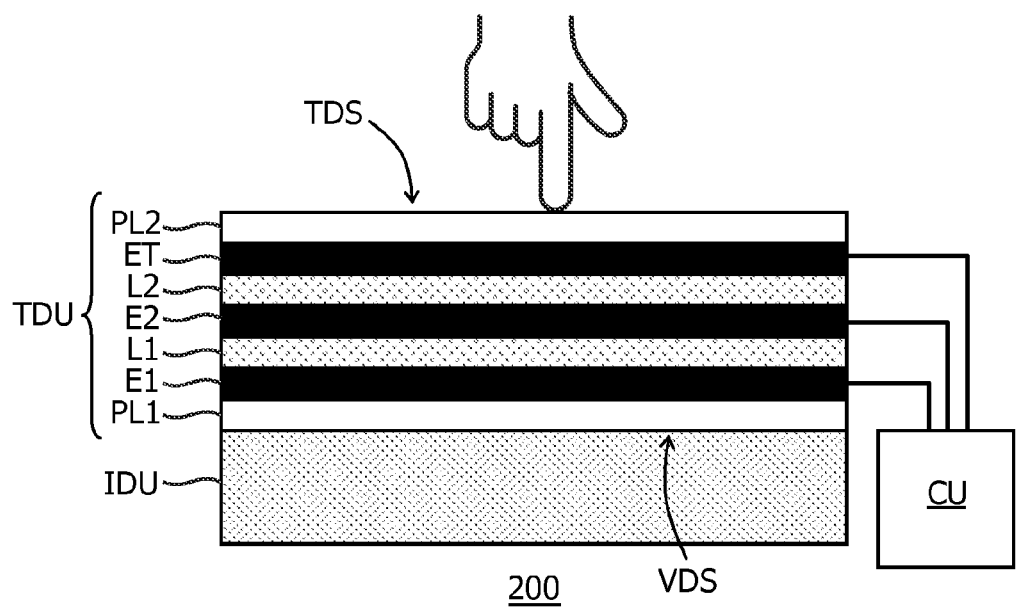
FIG. 6 schematically shows a section through a display device which comprises two EAP layers.

FIG. 6 shows schematically a display device 200 that incorporates the above features. It should be noted that this drawing (as well as FIG. 7) is not to scale (particularly the layer thicknesses are exaggerated), and that an internal structuring of the electrode arrays is not shown. The display device 200 comprises an image display unit IDU with a topology display unit TDU on top. The topology display unit TDU has the following sequence of layers, listed in direction from the visual display surface VDS to the topology display surface TDS:

An electrically insulating layer PL1 on top of the visual display surface VDS.

A first electrode E1 that is preferably connected to ground and shields the image display unit IDU from electrical fields in the topology display unit TDU.

A first EAP layer L1.

A second electrode E2 that can be provided with a high voltage.

A second the EAP layer L2.

A top electrode ET that is preferably connected to ground.

An electrically insulating layer PL2 that provides the tactile display surface TDS.

The electrode layers E1, E2, and E3 are connected to a control unit CU which supplies them with appropriate voltages. It should be noted that at least one of these layers (e.g. the central layer E2) will usually be subdivided into an array of single electrode units (not shown).

At the interface between the image display unit IDU and the topology display unit TDU, measures have to be taken such that the electric field inside the first is not affected by the high voltages (high electric fields) inside the latter. This can be achieved in the display device 200 by giving the bottom electrode E1 the same voltage as the upper electrodes of the image display unit IDU. In that way the electric field is zero in between and no capacitive charging occurs.

Figure 7:
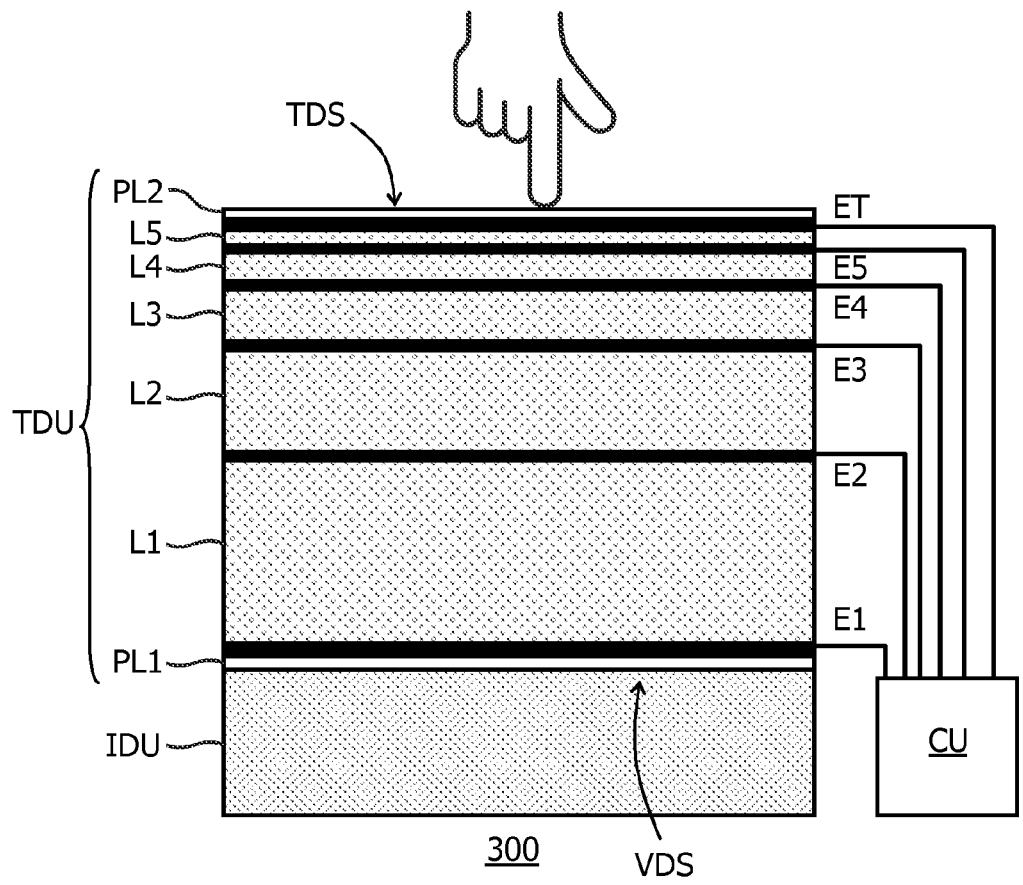
FIG. 7 schematically shows a section through a display device which comprises several EAP layers with varying thicknesses.

FIG. 7 shows a further embodiment of a display device 300 comprising a topology display unit TDU disposed on top of an image display unit IDU. As in the previous embodiment, the visual display surface VDS is covered by an electrical insulation PL1, which is in turn covered by an electrically conductive layer ET (typically grounded).

Similarly, the tactile display surface TDS is the outer surface of an insulating layer PL2 which resides on a topmost (and typically grounded) electrically conductive electrode ET.

Between the aforementioned components is a plurality of "active stacks", each active stack comprising an EAP layer (L1, L2, L3, L4, or L5) that is disposed between two electrode layers (E1 and E2, E2 and E3, E3 and E4, E4 and E5, or E5 and ET). Neighboring active stacks hence share the intermediate electrode layer.

In direction from the tactile display surface TDS to the visual display surface VDS, the EAP layers have increasing thicknesses, such that smaller, safe voltages can be applied across the layers closer to the user's skin upon actuation. The thickness of the EAP layers L1-L5 is adapted to generate a sufficiently strong electric field between the electrodes E1-ET for the applied voltages. In a typical example, these voltages may be 1 kV, 100 V, 10 V, and 1 V for the electrode layers E2, E3, E4, and E5, respectively (E0 and ET being grounded).

A further advantage of the described design is that no ground electrodes are required between the (high) voltage electrodes E2-E5. Starting from a high voltage (kV), the lower voltages may be generated in a control unit CU by a voltage division made with a resistive structure. Also, as the highest voltage electrode E2 is deep inside the stack, breakthrough currents will flow towards that electrode.

In the system just described the relation between the voltages applied to the different layers is fixed by the voltage dividing structure. In a more advanced embodiment, each layer may individually be addressed and a specific voltage may be applied to each layer separately.

The approach of the present invention and the described display devices have the following benefits:

A more natural appearance of different surfaces by extended visuals: actuation shows indentation or bumps, extra visual effect, 3D effect etc.

Real tactile effect: 3D topology that can be felt by the user, so that the surface does not only look like a specific surface, but also feels that way. Stimulation of audible, visual, tactile and thermal senses.

Support of a visual (or graphic) user interface with programmable tactile elements: A great promise of actuating polymers is in user-interfaces, where controls such as 'real buttons' and fabric feels can be created anywhere in the surface at will. Supporting these tactile elements with corresponding visuals will increase easy-of-use and naturalness.

Alternatively, fabric topologies can be explored to match a given color, prior to the actual realization of for example a dress.

Integration of tactile sensing: The polymer actuating layer forms a capacitor of which the capacitance changes when the layer is compressed. This can be used to sense tactile input from a user, and vice versa to provide tactile feedback to the user on touch detection.

Optotactile feedback/awareness creation by topographic driving. For example, the generation of topography in else wise fully transparent layer (for example, ripples in a water-like surface), or dyed dielectric elastomeric materials. This effect can be any combination between either a purely optical or purely tactile effect.

Applications of the invention comprise shape (surface topology)-changing display devices, user-interface surfaces (which combine GUI with real button topology), and touch screens.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A display device, comprising:
  a) an image display unit (IDU) having a visual display surface (VDS) at which a visual image can be displayed; and
  b) a topology display unit (TDU) having at least two layers and at least one array of electrode units (E2-ET) disposed on one of the at least two layers and having a regular matrix arrangement, the TDU having at least one array of counter-electrodes (E1-E5) having an irregular matrix arrangement, said TDU disposed adjacent to the visual display surface (VDS) and adapted to controllably change the surface topology on a tactile display surface (TDS) in conformal relationship with at least a portion of the visual image due to the application of a voltage to an electrode opposite the at least one array of electrode units.

2. The display device according to claim 1, further comprising a control unit (CU) for controlling the topology displayed on the tactile display surface (TDS), said control unit (CU) adapted to relate the displayed topology to the visual image displayed by the image display unit (IDU).

3. The display device according to claim 1, wherein the image display unit (IDU) is a display apparatus (IDU) on which different images can be displayed.

4. The display device according to claim 1, wherein the topology display unit (TDU) provides sensor signals indicating the application of external forces to the tactile display surface (TDS).

5. The display device according to claim 4, further comprising a control unit (CU) adapted to evaluate the sensor signals with respect to the location of the applied external forces.

6. The display device according to claim 1, wherein the topology display unit (TDU) comprises at least one "active stack" with
  a) a layer (L1-L5) of the at least two layers being an electroactive polymer EAP;
  b) the array of electrode units (E2-ET) disposed on a first side of the EAP layer;
  c) the at least one counter-electrodes (E1-E5), including the electrode opposite the at least one array of electrode units, disposed on a second side of the EAP layer; and
  d) at least one control electrode (EC).

7. The display device according to claim 6, wherein the EAP layer (L1-L5) is at least partially transparent.

8. The display device according to claim 6, wherein the topology display unit (TDU) comprises a plurality of said active stacks, and that the thickness of the EAP layers (L1-L5) of these active stacks increases with increasing distance from the tactile display surface (TDS).

9. The display device according to claim 6, wherein the electrode units (E2-ET) of the array and/or a plurality of counter-electrodes (E1-E5) and/or a plurality of control electrodes (EC) cover less than 100%, preferable less than 20%, most preferable less than 5% of the total available area in their respective layer.

10. The display device according to claim 6, wherein the electrode units (E2-ET) of the array and/or a plurality of counter-electrodes (E1-E5) and/or a plurality of control electrodes (EC) are arranged in a regular or irregular way.

11. The display device according to claim 6, wherein the topology display unit (TDU) comprises an insulating layer (PL2) that provides the tactile display surface (TDS) and/or an additional passive layer (PL2).

12. The display device according to claim 1, wherein indices of refraction of transparent components of the topology display unit (TDU) are similar to each other.

13. The display device according to claim 1, further comprising a conductive layer (EO) disposed between the image display unit (IDU) and the topology display unit (TDU) and/or a conductive layer (ET) disposed between the tactile display surface (TDS) and any other electrically conductive component (E1-E5) of the topology display unit, wherein said conductive layers (EO, ET) can be provided with a given electrical potential.

14. The display device according to claim 1, further comprising a control unit (CU) for controlling the topology display unit (TDU) and/or the image display unit (IDU), wherein said control unit is adapted to detect failure conditions and to interrupt an electrical power supply in response thereto.

15. A method for presenting information with a display device, comprising:
a) presenting a part of the information as a visual image on a visual display surface (VDS) of an image display unit (IDU);
b) presenting a further part of the information as a changeable topology on a tactile display surface (TDS) of a topology display unit (TDU), the TDU having at least two layers and at least one array of electrode units (E2-ET) disposed on one of the at least two layers and having a regular matrix arrangement, the TDU having at least one array of counter-electrodes (E1-E5) having an irregular matrix arrangement, wherein said tactile display surface is arranged adjacent to the visual display surface; and
c) changing the tactile display surface (TDS) in conformal relationship with at least a portion of the visual image so as to provide an extended visual effect by applying a voltage to an electrode opposite the at least one array of electrode units.

16. The method according to claim 15, wherein the extended visual effect substantially matches an expected surface topology and/or texture.

17. The method according to claim 16, wherein the extended visual effect includes at least one of indentations, bumps, and a three-dimensional effect such that the extended visual effect can be viewed and felt.

18. The method according to claim 15, further comprising sensing the application of external forces to the tactile display surface (TDS).

19. The method according to claim 18, further comprising evaluating sensor signals with respect to the location of the applied external forces.

20. The method according to claim 15, wherein the topology display unit (TDU) comprises at least one "active stack" with
a) a layer (L1-L5) of the at least two layers being an electroactive polymer EAP;
b) the array of electrode units (E2-ET) disposed on a first side of the EAP layer;
c) the at least one array of counter-electrodes (E1-E5), including the electrode opposite the at least one array of electrode units, disposed on a second side of the EAP layer; and
d) at least one control electrode (EC).

* * * * *